March 3, 1970  G. B. STONE  3,498,817
CONVEYOR PULLEY
Original Filed May 17, 1965
Fig. 1
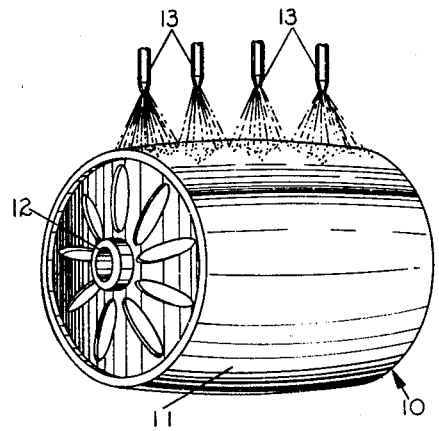
Fig. 2
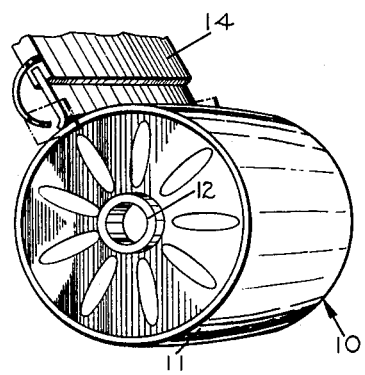
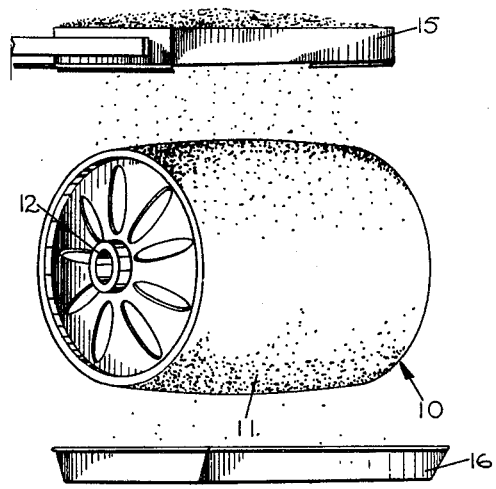
Fig. 3
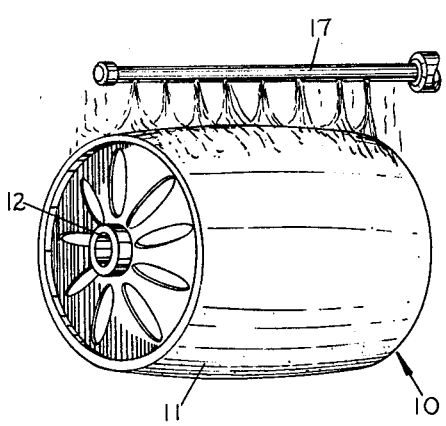
Fig. 4
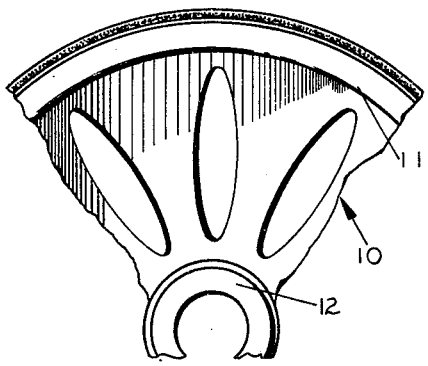
Fig. 5
INVENTOR.
GUTHRIE B. STONE
BY
Albert A. Mahassel
ATTORNEY

United States Patent Office 3,498,817
Patented Mar. 3, 1970

3,498,817
CONVEYOR PULLEY
Guthrie B. Stone, Honeoye, N.Y., assignor to Stone Conveyor Company, Inc., Honeoye, N.Y.
Continuation of application Ser. No. 456,142, May 17, 1965. This application Sept. 13, 1968, Ser. No. 761,892
Int. Cl. B44d 1/16
U.S. Cl. 117—26                                   3 Claims

ABSTRACT OF THE DISCLOSURE

A method for forming a frictional surface on a driving pulley by bonding a sprinkling of grit into a layer of epoxy cement applied to the prepared pulley surface and then coating the gritty surface with epoxy paint.

---

This application is a continuation of U.S. patent application Ser. No. 456,142, filed May 17, 1965, now abandoned.

This invention relates generally to the conveyor art and, more specifically, to an improvement in the various forms of belt driving pulley elements utilized in conveyor mechanisms.

A further and more specific object is that of increasing the frictional characteristics of the face portions of a pulley by bonding granules of grit about the entire extent of said face portions.

Further objects and advantages of the invention will become apparent from the following more detailed disclosure.

Pulley elements adapted to function in conjunction with endless belts become very smooth and polished after a comparatively short period of operation. A condition such as this is not considered feasible where the belt members are expected to travel at a predetermined rate of speed, for slippage is induced by the highly polished pulley elements and adjustments thereto are usually not permanent.

Numerous forms of laggings are available for the purpose of increasing the frictional characteristics of pulley face surfaces such as sheet material of rubber or grit cloth that may be wrapped about the face of a pulley and fixedly attached thereto by either cementing or with mechanical fastenings. Many of these forms of laggings perform their intended function with satisfaction but with regards to material cost, the numerous operational steps required for their manufacture, and the useful life of the part under actual operating conditions leave something to be desired with respect to a pulley element which possesses the frictional qualities desired, yet is economically desirable as to its manufacturing costs and life expectancy.

The method of lagging the face of a pulley element according to the instant invention possesses these favorable characteristics.

With this method of lagging, which will be more fully described hereinafter, the pulley face is first roughened and cleaned. The surface is then coated with an adhesive and before the latter is cured a multiplicity of grit granules are sprinkled onto the adhesive. A curing process is then applied to the adhesive and as a final step the entire outer surface of the pulley is spray coated with a protective finish. This final protective coating reduces the initial sharpness to outer surfaces of the individual granules of grit and serves to lock them more securely in position leaving an irregular pulley surface which provides the required frictional qualities to prevent slippage during its intended function.

The invention will be described in detail by reference to the specific embodiments thereof which are illustrated in the accompanying figures of drawing, wherein:

FIG. 1 is a perspective view of a pulley member showing a grit blasting means for cleaning and roughening the face portion of the pulley;

FIG. 2 is a view similar to that of FIG. 1 but showing the means by which the adhesive is applied to the face portion of the pulley;

FIG. 3 is a perspective view showing one means of applying grit granules to the adhesive coated pulley surface;

FIG. 4 is another perspective view of the pulley but showing a means by which heat may be applied for accelerated curing of the adhesive; and FIG. 5 is an elevational view of a portion of the pulley member as seen looking from one end thereof and showing different layers of coatings forming this lagging process.

Now referring to the various figures of drawing, a pulley member is generally indicated in FIGS. 1–4 by numeral 10. This pulley member includes a face portion 11 and a hub 12 through which a pin or shaft (not shown) is adapted to extend to permit rotary movement of the pulley while performing its intended function as well as the necessary rotary movement for applying the lagging according to the invention.

FIG. 1 shows the initial step for preparing the face portion 11 of the pulley and includes a plurality of nozzles 13 through which a coarse grit is forced. This grit may be in the form of sand or shot and is effective in cleaning and roughening the face portion 11 in preparation for the second step which is shown in FIG. 2. In this figure of drawing an adhesive applicator 14 is disposed above and in close proximity with the face portion 11 of the pulley.

As the pulley is caused to rotate, a coating of epoxy cement (approx. 430 mils thick) which has been premixed with a hardening catalyst is applied over the entire face portion 11. An example of an adhesive found to be most suitable for the purpose of the instant invention is Bisphenol-A+epichlorohydrin epoxy with a polyamide catalyst premixed therewith as a curing agent.

Before this cement has had an opportunity to harden, the third step of the lagging application is performed as shown in FIG. 3. This step includes the sprinkling of a white silica sand (approx. #50 grit) over the entire face portion 11 and as shown in FIG. 3, a shaker box 15 containing such sand is disposed above the pulley member 10. The shaker box when agitated permits the granules of said to drop onto the coated surface of the pulley (approx. 1200 particles per square inch). A receptacle 16 is positioned below the pulley and is adapted to receive the excess granules of sand which do not adhere to the adhesive on the pulley face.

The recommended drying time for this type of epoxy is four hours at 72° F.; however, FIG. 4 shows an accelerated method of curing the adhesive by means of forced warm air.

In this figure of drawing a warm air duct 17 having a plurality of outlet orifices 18 on the lower side thereof is positioned above the pulley and traverses the face portion thereof. As the pulley is caused to rotate, warm air is forced outwardly from the duct 17 through the outlet orifices 18 and onto the face portion 11 of the pulley. This warm air is effective in decreasing substantially the normal curing time of the epoxy adhesive.

The last and final step of this novel method of lagging a pulley is that of spraying a coat of epoxy (approx. 5 mils thick) over the entire outer surface of the pulley. This epoxy is in the form of paint including a coloring pigment and is also premixed with a polyamide catalyst that serves as a curing agent. The recommended drying time for this final spray coat of epoxy is forty-eight hours at 72° F.; however, this time can be decreased considerably by subjecting the pulley to the forced warm air apparatus depicted in FIG. 4.

The final spray coat of epoxy which covers the entire exterior surface of the pulley reduces the initial sharpness of the sand granules held by the initial coating of epoxy and locks in said sand granules more firmly. Additionally, the irregular surface of the face portion provides a long lasting surface having desirable frictional characteristics for contact with a conveyor belt with which it is adapted to cooperate.

While one embodiment of the invention has been disclosed, it is to be understood that the inventive concept may be carried out in a number of ways.

I claim:

1. A belt driving pulley having an uninterrupted, substantially cylindrical exterior surface with improved frictional characteristics for driving engagement with a flexible belt which comprises a first epoxy resin adhesive layer applied to said surface, a multiplicity of grit granules imbedded in said first adhesive layer, and a second epoxy resin adhesive layer encompassing the entirety of said exterior surface.

2. A belt driving pulley according to claim 1 wherein said second layer forms a coating upon said grit granules while still providing an irregular outer surface on said pulley.

3. A belt driving pulley according to claim 2 wherein said exterior surface is rigid and supported for rotation about a central axis by a rigid hub assembly, the irregular outer surface of the second layer defining a belt driving surface extending throughout the surface area of the pulley.

References Cited

UNITED STATES PATENTS

| | | | |
|---|---|---|---|
| 2,343,957 | 3/1944 | Crompton | 117—29 X |
| 2,740,725 | 4/1956 | Ball | 117—29 X |
| 2,842,929 | 7/1958 | Schultz et al. | 117—33 |
| 2,970,929 | 2/1961 | Hansen | 117—25 X |
| 3,013,870 | 12/1961 | Ackerman | 117—33 X |
| 3,023,121 | 2/1962 | Dyar | 117—26 X |
| 3,190,137 | 6/1965 | Adams | 117—33 X |

MURRAY KATZ, Primary Examiner

PAUL ATTAGUILE, Assistant Examiner

U.S. Cl. X.R.

117—33